United States Patent [19]

Holtvluwer

[11] Patent Number: 4,859,988

[45] Date of Patent: Aug. 22, 1989

[54] AUTOMOTIVE VEHICLE EXTERIOR LIGHT FLASHING CIRCUIT

[75] Inventor: Douglas C. Holtvluwer, Jenison, Mich.

[73] Assignee: Emergency Technology, Inc., Jenison, Mich.

[21] Appl. No.: 196,485

[22] Filed: May 19, 1988

[51] Int. Cl.$^4$ .............................................. B60Q 1/52
[52] U.S. Cl. ..................................... 340/471; 307/10.8
[58] Field of Search ............... 340/83, 81 R, 81 F, 340/91, 95, 468, 471, 463, 479; 315/77, 83; 307/10 LS, 10.8

[56] References Cited

U.S. PATENT DOCUMENTS

| | | | |
|---|---|---|---|
| 2,090,332 | 8/1937 | O'Neil | 340/83 |
| 2,273,747 | 2/1942 | Adler, Jr. | 340/83 |
| 2,300,896 | 11/1942 | Hosmer . | |
| 2,851,673 | 9/1958 | Hollins . | |
| 2,869,033 | 1/1959 | Cherefko . | |
| 3,037,188 | 5/1962 | Weigl . | |
| 3,109,158 | 10/1963 | Coombs . | |
| 3,305,695 | 2/1967 | Late . | |
| 3,413,519 | 11/1968 | Leeder, Jr. . | |
| 3,576,523 | 4/1971 | Lerbakken | 340/83 |
| 3,925,759 | 12/1975 | Lucas | 340/81 R |
| 3,975,708 | 8/1976 | Lusk et al. | 340/81 R X |
| 4,096,469 | 6/1978 | Hollins | 340/81 R |
| 4,155,069 | 5/1979 | Mason . | |
| 4,309,639 | 1/1982 | Thrower, Jr. et al. . | |

OTHER PUBLICATIONS

Publication entitled, "Lighting Equipment and Photometric Tests, Standards Recommended Practices Information Reports", 1-1977.

Primary Examiner—Joseph A. Orsino
Assistant Examiner—Brian R. Tumm
Attorney, Agent, or Firm—Price, Heneveld, Cooper, DeWitt & Litton

[57] ABSTRACT

A vehicle exterior light flashing unit for use with a vehicle having a pair of rearwardly projecting red and/or yellow lamps such as brake lights or turn signals and one or more white lamps such as backup lights. The unit, which can be connected to such vehicle without interrupting the existing lamp control circuit, energizes the red/yellow lamps alternatingly with the white lamps to produce highly visible alternating sequence of white and red light to indicate a hazardous condition. If the vehicle also includes a third center brake light, it may be energized together with the other red/yellow lamps to produce a pattern of light having an alternating geometric form of a triangle and a horizontal line to additionally enhance recognition.

13 Claims, 2 Drawing Sheets

AUTOMOTIVE VEHICLE EXTERIOR LIGHT FLASHING CIRCUIT

BACKGROUND OF THE INVENTION

This invention relates to a vehicle exterior light flashing circuit and in particular to a flashing circuit of the type that may be applied to existing exterior light control circuits as a field-installed accessory.

Automotive vehicle exterior light flashing circuits have been provided in the prior art which intermittently actuate selected vehicle exterior lights for the purpose of indicating that a vehicle is disabled or proceeding at a very slow speed. Such vehicle exterior light flashing circuits conventionally operate a pair of lamps that are normally used for another purpose, such as the brake lights, off and on intermittently to attract attention to the status of the vehicle. The prior art light flashing circuits are typically incorporated into the design of the vehicle and are, as such, not suitable for field installation on existing vehicles because substantial modification to the existing lamp control circuitry would be required. While conventional vehicle exterior light flashing circuits perform their function of attracting attention to the vehicle under many adverse conditions, there exists a need to improve the visability of the vehicle which is disabled or otherwise a hazard when the ambient conditions are exceptionally bad. Further, there exists a need for such a vehicle lamp control circuit that may be incorporated into the design of new vehicles or field-installed on existing vehicles.

SUMMARY OF THE INVENTION

A vehicle exterior light flashing circuit according to the present invention operates the rear brake lights and turn signal light together in alternating sequence with the backup lights of the vehicle to provide a flashing sequence of white light alternating with red and/or amber light. The red/amber light is a universal sign of danger but is not exceptionally visible because a significant amount of the color spectrum has been removed. The white light produced by the backup lights, in contrast, provides the full color spectrum and hence the highest possible luminescence per unit of incandescent lamp power. The white light is, therefore, the most penetrating and capable of being detected under all adverse conditions. Thus, the present invention provides a sequence of lamp illumination which is far superior to previous systems in attracting attention, which is the purpose of a hazard warning system.

These and other related objects, advantages and features of this invention will become apparent upon review of the following specification in conjunction with the drawings.

DESCRIPTION OF THE PREFERRED EMBODIMENT

Figure 1:
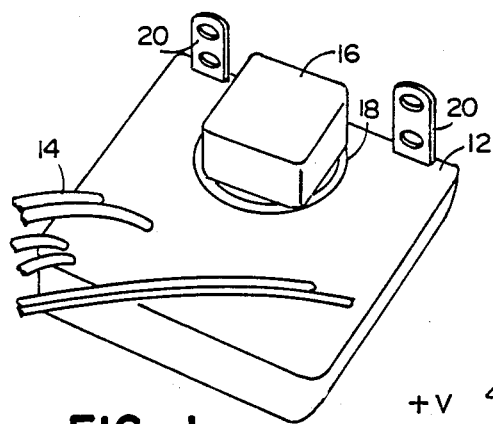
FIG. 1 is a perspective view of a vehicle exterior light flashing circuit assembly according to the present invention.

Referring now specifically to the drawings, and the illustrative embodiments depicted therein, a vehicle exterior light flashing unit, generally shown at 10, includes an epoxy casing 12 enclosing a circuit board (not shown), a plurality of connecting leads 14 extending from the casing and an electromechanical relay 16 mounted to a socket 18 embedded in casing 12. Light flashing circuit assembly 10 further includes a pair of brackets 20 having a plurality of openings extending therethrough to provide a mechanical support for the light flashing unit 10.

Figure 2:
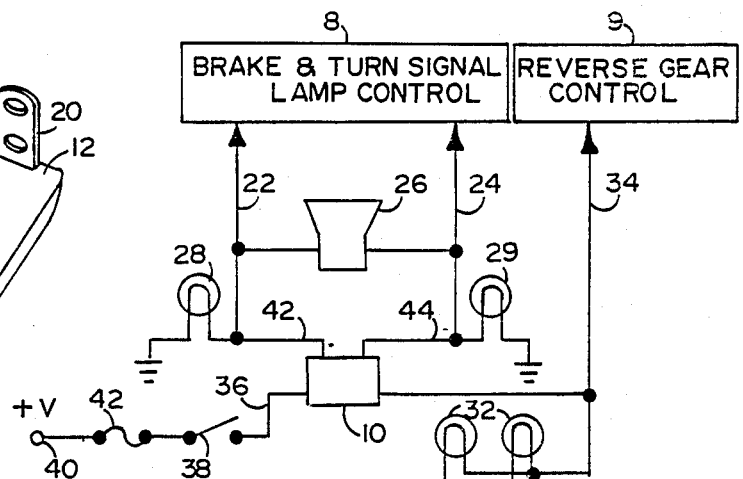
FIG. 2 is a schematic diagram of a light flashing circuit according to the invention installed in a vehicle having an existing three-wire rear lamp control system.
Figure 6:
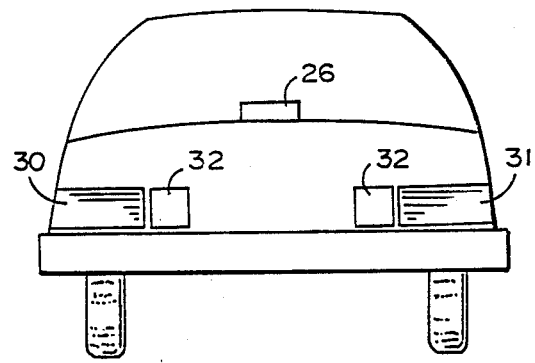
FIG. 6 is a rear view of a vehicle illustrating the light arrangement that the present invention operates.

Application of light flashing circuit to one particular type of vehicle is illustrated in FIG. 2. In the vehicle circuit illustrated in FIG. 2, leads 22 and 24 provide control input for the center brake light 26, traditionally mounted in the vehicle's rear window or on the trunk lid (FIG. 6) and a pair of lamps 28 and 29, each having two filaments which function as both a brake light and the respective turn signal light. The conventional vehicle lamp control in FIG. 2 includes a brake and turn-signal lamp control 8 which energizes third brake light 26 and both brake lights 28 and 30 on both respective filaments by providing a 12 volt positive signal to both leads 22 and 24 in response to actuation of the vehicle's brakes. With a positive voltage to only lead 22 and not lead 24, lamp 28 is energized on a single filament and lamps 26 and 29 are not energized. Conversely, with positive 12 volts applied to lead 24, lamp 29 is energized on one filament to act as a right-turn signal and lamps 26 and 28 are not energized.

The vehicle rear lamp control circuit in FIG. 2 further includes a pair of backup lights 32 which are wired in parallel between a chassis ground and a control lead 34. When a positive 12 volts is applied by reverse-gear lamp control 9 to lead 34 in response to the vehicle being placed in reverse gear, lamps 32 are energized. In the vehicle shown in FIGS. 2 and 6, lamps 28 and 29 are positioned respectively behind color lenses 30 and 31 and emit a light in a visible red spectrum. Lamps 32 emit light in a visible white spectrum.

FIG. 2 further illustrates a light flashing unit 10 added to the vehicle lamp control circuit. Light flashing unit 10 includes a power lead 36 connected in series with a power switch 38 which is connected to a positive 12 volt terminal 40 through a fuse 42. Flashing unit 10 further includes an output lead 42 connected to control lead 22, an output lead 44 connected to control lead 24 and an output lead 46 connected to control lead 34.

The control system illustrated in FIG. 2, which includes a conventional vehicle rear lamp control circuit and a vehicle exterior light flashing unit 10 connected directly to the control leads of the existing vehicle lamp control circuit without interrupting any of the existing circuit connections, operates as follows. When switch 38 is closed, positive voltage is applied from terminal 40 through lead 36 to circuit assembly 10. Circuit assembly 10 operates at a flashing rate of approximately 114 flashes per minute and alternatingly apples a positive 12 volts to leads 42 and 44 during one portion of the cycle and to lead 46 at the opposite portion of each flashing cycle. In this manner, flashing circuit assembly 10 alternatingly illuminates third brake light 26 and both brake lights 28 and 29, positioned behind lenses 30, 31, respectively, during one portion of the cycle and both backup lights 32 in the opposite portion of the cycle. Because the brake lights emit visible light in a red spectrum and are arranged in a triangle (FIG. 6) and the lights 32 emit visible light in a white spectrum and are arranged on a linear horizontal orientation, the flashing circuit unit, when energized, causes an alternating sequence of a red triangle with a white linear shape at a rate of 114 flashes per minute. This sequence provides outstanding contrast and visual penetration in even the most extreme weather conditions and from a great distance.

Figure 3:
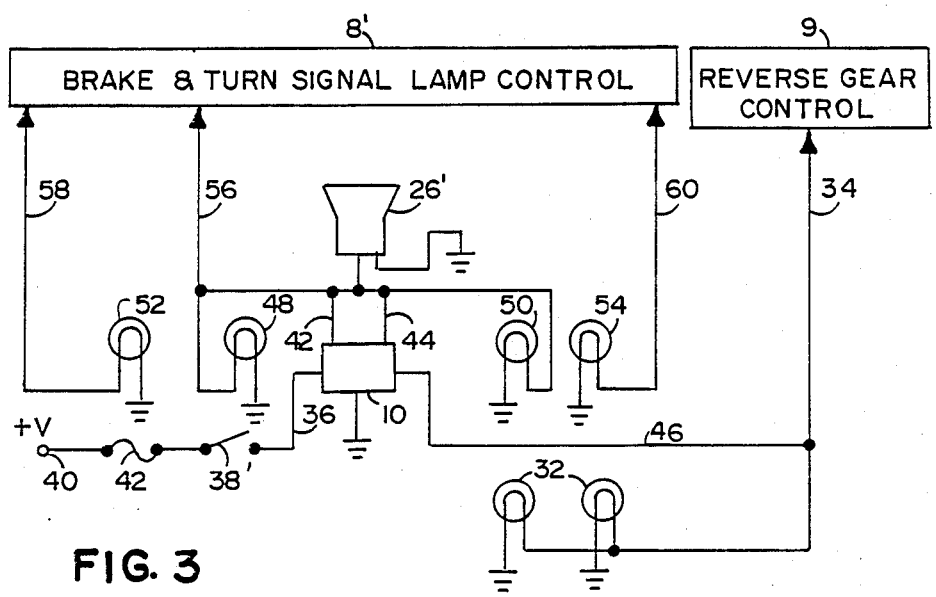
FIG. 3 is a schematic diagram of a light flashing circuit according to the invention installed in a vehicle having an existing four-wire rear lamp control system.

FIG. 3 illustrates a vehicle exterior light flashing circuit unit 10 applied to an existing vehicle rear lamp control circuit having brake lights 26', 48 and 50 which are controlled by leads separate from those used to control turn signal lights 52 and 54. In the circuit in FIG. 3, brake lights 48 and 50, which are located behind lenses 30 and 31 (FIG. 6) and third brake light 26' are connected electrically in parallel between control lead 56 and chassis ground and are energized by the application of positive 12 volts from brake and turn-signal lamp control 8' to control lead 56. A single filament signal lamp 52 is connected between a control lead 58 and chassis ground and is operated by the application of positive voltage from brake and turn-signal lamp control 8' to control lead 58. Similarly, turn signal lamp 54 is operated by positive voltage being applied from brake and turn-signal lamp control 8' to a control lead 60 connected thereto. As with the circuit in FIG. 2, backup lights 32 are connected in parallel between control lead 34 and chassis ground and are energized by application of a positive voltage from reverse-gear lamp control 9 to a control line 34. Unit 10 is connected in FIG. 3 by connection of both output lines 42 and 44 to control line 56 and connection of output line 46 to control line 34.

In operation, the combined conventional vehicle rear lamp control circuit and exterior light flashing unit illustrated in FIG. 3 operates conventionally by application of a positive voltage from control 8' on line 56 to energize brake lights 26' and 48 and 50 in response to the brake pedal being actuated and lamps 52 and 54 are selectively illuminated in a intermittent fashion by application of an intermittent positive voltage from control 8' to lines 58 or 60, respectively. Lamps 32 are operated by application of a positive voltage from control 9 to line 34 in response to the vehicle being placed in reverse gear. The closing of switch 38 applies power from terminal 40 through fuse 42 and line 36 to light flashing unit 10. When power is applied to unit 10, positive 12 volts is applied alternatingly between output leads 42 and 44 in one portion of each cycle and output lead 46 in the opposite portion of each cycle. In this manner, the closing of switch 38, causes brake lights 48, 50 and 26' to be alternatingly energized with lamps 32.

Figure 4:
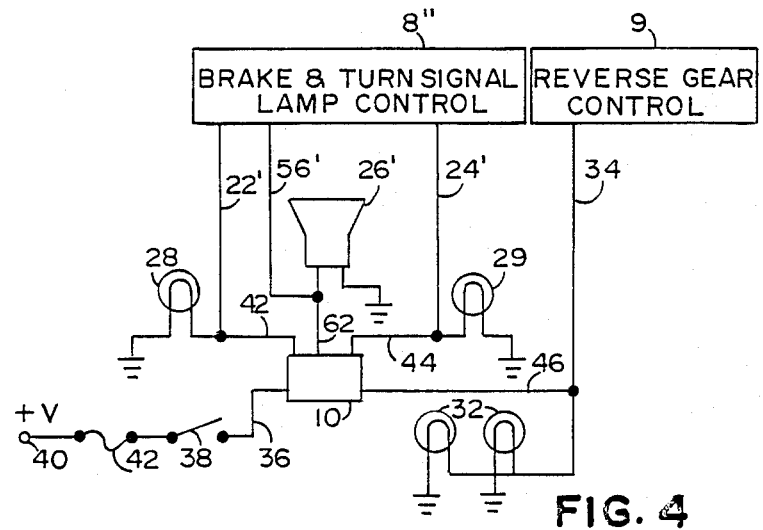
FIG. 4 is a schematic diagram of a light flashing circuit according to the invention installed in a vehicle having a modified three-wire rear lamp control circuit.

FIG. 4 illustrates light flashing unit 10 connected to a vehicle lamp control circuit that is a highbred of the circuits illustrated in FIGS. 2 and 3. In FIG. 4 control leads 22' and 24' operate combined turn signals and brake lights 28 and 29, respectively and a control lead 56' separately operates the third brake light 26'. As above, backup lamps 32 are connected in parallel between chassis ground and a control lead 34. In the embodiment in FIG. 4, light flashing control assembly 10 has output leads 42 and 44 connected to control leads 22' and 24', respectively, and output lead 46 is connected to control lead 34. The circuit assembly in FIG. 4 further includes an output lead 62 connected to control lead 56'.

In operation of the combined vehicle rear light control circuit and exterior light flashing unit in FIG. 4, lamps 28 and 29 are operated in dual filament mode by application of positive voltage from brake and turn-signal lamp control 8'' to both control leads 22 and 24 simultaneously. With one control lead 22 or 24 energized, the corresponding lamp 28, 29 is energized in a single filament mode and the opposite lamp is deenergized. With a positive voltage applied by brake and turn-signal lamp control 8'' to control line 56', third brake light 26' is energized. With a voltage applied by reverse-gear lamp control 9 to control line 34, backup lights 32 are energized. When switch 38 is closed, positive 12 volts is applied to circuit assembly 10 through line 36 which causes an alternating sequence which energizes lines 42, 44 and 62 during one portion of the sequence and line 46 in the opposite portion of the sequence in order to energize the three brake lights 26', 28 and 29 together alternatingly with the backup lights 32.

In the illustrated embodiments, backup lights and turn signal lights are illustrated as positioned behind lenses 30 and 31. Lenses 30 and 31 are light filters which filter out all of the light emitted by the brake lights and turn signal lights with the exception of light within a visible red wavelength. Alternatively, lenses 30 and 31 may be configured to filter out all of the light produced by the brake lights and turn signals with exception of light in the visible amber wavelength. While combined brake lights and turn signals 28 and 29 must each necessarily be located behind a lens 30 and 31, respectively, the separate brake lights 48, 50 and turn signals 52 and 54 in FIG. 3 may each be provided with a separate lens 30, 31. Therefore, in the FIG. 3 embodiment, brake lights 48 and 50 may be provided behind a lens which emits only visible red light while turning signals 52 and 54 may be provided behind lenses which emit only visible amber light. If so, then the embodiment illustrated in FIG. 3 will alternatingly flash light in both the visible amber and red wavelength in one portion of the cycle with light in the visible white spectrum in the opposite portion of the sequence.

Figure 5:
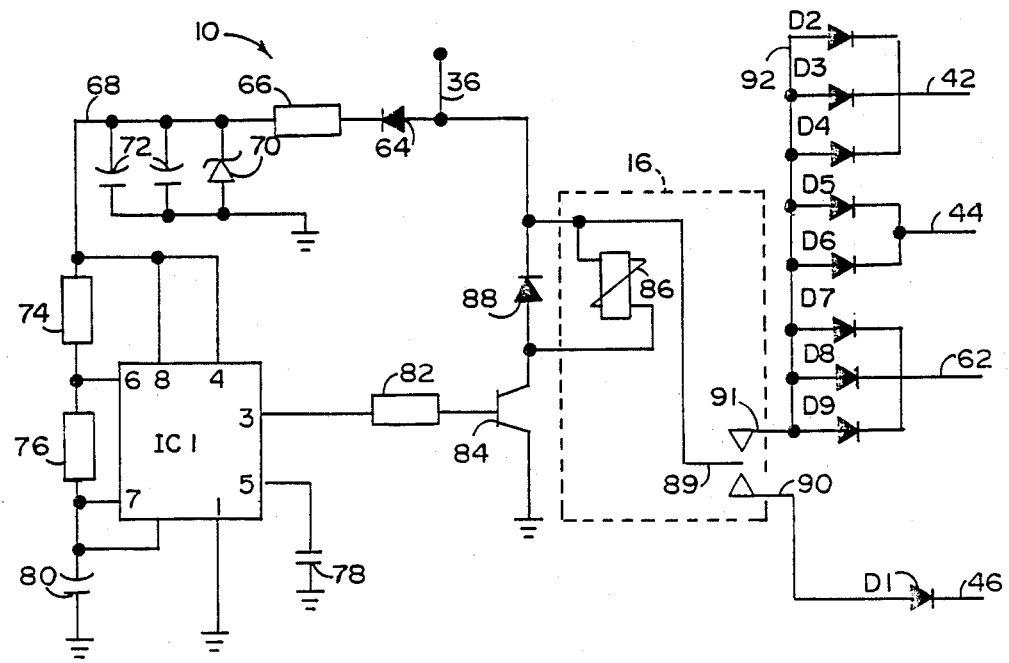
FIG. 5 is a schematic diagram of a light flashing circuit according to the invention.

Vehicle exterior light flashing unit 10 is illustrated in schematic form in FIG. 5. Positive voltage lead 36 is connected through a reverse voltage protection diode 64 and dropping resistor 66 to a line 68 connected to leads 4 and 8 of IC1. Line 68 is connected to ground through a parallel combination of a zener diode 70 and a pair of capacitors 72. Biasing resistors 74 and 76 are connected respectively between terminals 6 and 8 and 6 and 7 of IC1. Terminals 5 and 7 of IC1 are connected to ground through capacitors 78 and 80. Pin 1 of IC1 is connected directly to ground. Pin 3 of IC1 is connected through current-limiting resistor 82 to the base of a switching transistor 84. The emitter of transistor 84 is connected to ground and its collector is connected in series with the coil 86 of relay 16. The opposite terminal of coil 86 is connected to positive voltage line 36. A diode 88 is provided in anti-parallel connection across coil 86.

The movable contact 89 of relay 16 is connected to positive voltage line 36. One stationary contact 90 of relay 16 is connected to output line 46 through a diode D1. The other stationary contact 91 of relay 16 is connected to a bus 92. Bus 92 is, in turn, connected to output lead 42 through a parallel connection of diodes, D2, D3 and D4. Bus 92 is connected to output lead 44 through a parallel connection of diodes D5 and D6. Output bus 92 is connected to output line 62 through a parallel connection of diodes D7, D8 and D9.

IC1 is a commercially available integrated circuit sold under the part number NE55 by a multitude of manufacturers such as Motorola Corporation. IC1 produces a square wave output on pin 3 at a frequency determined by the values of resistors 74 and 76 and capacitors 78 and 80 and, in the preferred embodiment, is 1.9 Hz. Dropping resistor 66 and zener diode 70 establish the appropriate voltage on line 68 in order to supply IC1. The square wave on pin 3 of IC1 causes transistor 84 to intermittently switch between a nonconducting and a saturated state.

When transistor 84 is in a saturated state, current flows from line 36 through relay coil 86 to ground causing relay 16 to pull in. When relay 16 is pulled in, movable contact 89 is connected to terminal 90 thus applying voltage from line 36 to contact 90. The positive voltage on line 90 forward biases diode D1 and causes the positive voltage, less a small forward-junction voltage drop across D1, to appear at output lead 46. When transistor 84 is not conducting, current does not flow through relay coil 86 so relay 16 drops out. When relay 16 drops out, movable contact 89 is connected to contact 91 which causes positive voltage from voltage lead 36 to be applied to bus 92. The positive voltage on bus 92 is applied to output leads 42, 44 and 62 through their respective parallel diode combinations, with the exception of a slight forward bias voltage drop across the diodes.

In this manner, with a positive voltage applied to line 36, relay 16 is intermittently pulled in and dropped out at a rate of approximately 114 cycles per minute. Voltage from line 36 is thus alternatingly applied to lines 46, in one portion of the cycle, and lines 42, 44 and 62 in other portions of the cycle causing the flashing sequence previously described to occur. The purpose of diodes D1-D9 is to isolate control lines 42, 44, 46 and 62 from each other so that the flashing circuit assembly 10 does not provide a "sneak path" for inadvertently energizing one lamp from the control line of another lamp in the conventional vehicle lamp control circuit. Diodes D2-D4 may be replaced by a single diode having the combined current capacity of the three diodes. The same applies to diodes D5 and D6 and D7-D9.

The present invention may be applied by connecting brackets 20 to a convenient surface of the vehicle, connecting line 36 to a conveniently located control switch 38 and attaching lines 42, 44, 46 and 62 to appropriate lines of the existing vehicle rear lamp control circuit. The leads of the existing circuit do not have to be cut or otherwise reconfigured. Thus, if it be desired to remove the add-on flashing control circuit, the existing vehicle lamp control circuit will be in operating condition without further reconnections.

Changes and modifications in the specifically described embodiments can be carried out without departing from the principles of the invention. For example, although the invention was illustrated for use with an automobile, it would have applicability to trucks, buses and construction equipment. It could also be adapted to a vehicle having a positive ground electrical system. The scope of protection is intended to be limited only by the scope of the appended claims, as interpreted according to the principles of patent law including the Doctrine of Equivalents.

The embodiments of the invention in which an exclusive property or privilege is claimed are defined as follows:

1. A vehicle lighting system comprising:
    a first pair of lamps located at laterally spaced apart positions on a rearwardly facing portion of said vehicle, said lamps projecting visible light in a yellow spectrum, a red spectrum or both a red and a yellow spectrum when said lamps are energized;
    a second lamp means located on a rearwardly facing portion of said vehicle for projecting visible light in a white spectrum when said second lamp means is energized;
    a third lamp positioned laterally between said first pair of lamps on a rearwardly facing portion of said vehicle and projecting visible light in a red spectrum when said third lamp is energized;
    first control means selectively operable for energizing said first pair of lamps together and including means for energizing said third lamp;
    second control means selectively operable for energizing said second lamp means;
    flashing means selectively operable for energizing said first pair of lamps and said third lamp alternatingly with said second lamp means whereby, a hazard warning signal is produced that alternates between red or yellow or both to indicate danger and white to provide superior visibility; and
    wherein said third lamp is positioned vertically between said first pair of lamps, forming a triangle with said first pair of lamps.

2. The system in claim 1 in which said flashing means comprises a plurality of output leads and switching means for applying a voltage alternatingly between selected ones of said leads.

3. The system in claim 2 further including diodes in series connection between said switching means and said output leads.

4. The system in claim 2 in which said switching means comprises a relay and squarewave generating means having an output connected to said relay.

5. The system in claim 1 in which said second lamp means comprises a pair of laterally spaced lamps.

6. The system inclaim 1 in which said first control means is operated in response to the vehicle being braked.

7. A vehicle lighting system comprising:
    a first pair of lamps located at laterally spaced apart positions on a rearwardly facing portion of said vehicle, said lamps projecting visible light in a yellow spectrum, a red spectrum or both a red and a yellow spectrum when said lamps are energized;
    first control means selectively operable for energizing said first pair of lamps together;
    a second lamp means located on a rearwardly facing portion of said vehicle for projecting visible light in a white spectrum when said second lamp means is energized;
    second control means selectively operable for energizing said second lamp means;
    flashing means selectively operable for energizing said first pair of lamps alternatingly with said second lamp means whereby, a hazard warning signal is produced that alternates between red or yellow or both to indicate danger and white to provide superior visibility; and wherein said second control means is operated in response to the vehicle being placed in reverse gear.

8. The system in claim 7 in which said flashing means comprises a plurality of output leads and switching means for applying a voltage alternatingly between selected ones of said leads.

9. The system in claim 8 further including diodes in series connection between said switching means and said output leads.

10. The system in claim 8 in which said switching means comprises a relay and squarewave generating means having an output connected to said relay.

11. The system in claim 7 further including a third lamp positioned laterally between said first pair of lamps on a rearwardly facing portion of said vehicle and projecting visible light in a red spectrum when said third lamp is energized, wherein said first control means further includes means for energizing said third lamp and wherein said flashing means is selectively operable for energizing said third lamp and said first pair of lamps alternatingly with said second lamp means.

12. The system in claim 7 in which said second lamp means comprises a pair of laterally spaced lamps.

13. The system in claim 7 in which said first control means is operated in response to the vehicle being braked.

* * * * *